(12) United States Patent
Knox

(10) Patent No.: US 6,614,886 B2
(45) Date of Patent: Sep. 2, 2003

(54) AUTOMATIC VOICE RESPONSE CALL OUT SYSTEM

(76) Inventor: Lee Knox, 310 Adams Ave., Endicott, NY (US) 13760

( * ) Notice: Subject to any disclaimer, the term of this patent is extended or adjusted under 35 U.S.C. 154(b) by 0 days.

(21) Appl. No.: 09/370,145

(22) Filed: Aug. 9, 1999

(65) Prior Publication Data

US 2003/0103605 A1 Jun. 5, 2003

(51) Int. Cl.[7] .............................................. G06F 17/60
(52) U.S. Cl. ........................ 379/88.12; 705/31; 379/40; 379/93.12; 709/218
(58) Field of Search ........................ 379/88.12, 88.26, 379/100.16, 106.03, 114.03, 142.06, 69, 93.01, 40, 93.12; 705/40, 42, 19, 31; 709/218

(56) References Cited

U.S. PATENT DOCUMENTS

| | | | | |
|---|---|---|---|---|
| 4,674,056 A | * | 6/1987 | Goodfellow | 235/432 |
| 5,117,353 A | * | 5/1992 | Stipanovich et al. | 705/11 |
| 5,255,305 A | * | 10/1993 | Sattar | 379/32.01 |
| 5,465,206 A | * | 11/1995 | Hilt et al. | 705/40 |
| 5,590,186 A | * | 12/1996 | Liao et al. | 379/210 |
| 5,710,884 A | * | 1/1998 | Dedrick | 709/217 |
| 5,866,889 A | * | 2/1999 | Weiss et al. | 235/379 |
| 6,064,990 A | * | 5/2000 | Goldsmith | 705/75 |
| 6,067,522 A | * | 5/2000 | Warady et al. | 705/2 |
| 6,173,272 B1 | * | 1/2001 | Thomas et al. | 705/42 |
| 6,202,052 B1 | * | 3/2001 | Miller | 705/31 |
| 6,347,306 B1 | * | 2/2002 | Swart | 705/32 |

* cited by examiner

Primary Examiner—Fan Tsang
Assistant Examiner—Simon P. Sing
(74) Attorney, Agent, or Firm—Salzman & Levy; David L. Banner

(57) ABSTRACT

The present invention features a method for providing status information to a client based on data residing in an electronic database or e-file. The database of the information is maintained and updated, and is periodically analyzed to determine whether at least a portion of the data has changed since the last analysis or communication. If so, the client is automatically informed by the system, which initiates an automatic voice response (AVR) call out to the client. The client verifies that he or she is the true intended recipient of the status information before it is communicated. A log of this communication is also maintained by the system. The client has the opportunity to respond to the system AVR call and/or correct or provide additional information, the client voice response being stored in an appropriate voice mailbox.

13 Claims, 2 Drawing Sheets

AUTOMATIC VOICE RESPONSE CALL OUT SYSTEM

FIELD OF THE INVENTION

The present invention relates to providing status of data residing in a database and, more particularly, to a system for providing status information to a client automatically when at least some of the data is changed.

BACKGROUND OF THE INVENTION

One of the pleasures for a service provider in dealing with clients is the opportunity to communicate with them. It is not unusual for a lawyer, a therapist, an architect, a physician, a stockbroker, a banker or a business person to contact his or her clients or patients, from time to time, to exchange information. Certainly, one of the most common information exchange procedures is to update clients or patients as to the status of activities that are being performed on their behalf.

Due to the nature of business, however, many service providers are confronted with a significant number of status queries from their clients, sometimes on a daily or even on a more frequent basis. Such status queries are not necessarily productive for both parties and, in fact, can become disruptive to the business of the service provider.

Fortunately, we are now all accustomed to automated telephone systems that are used to provide information to a caller for such diverse purposes as determining the balance on a charge card account, verifying airline reservations, or ascertaining the availability of concert tickets. Indeed, it is difficult to believe that anyone living in our modern age has not used such an automated telephone system at one time or another. Thus, customer resistance to such automated telephone systems for status information has decreased over the years.

The field of accounting is no exception to the general principles described above. A client of an accountant or a bookkeeper (hereinafter a "tax preparer") is likely to desire information about his or her tax return, for example, not only during the preparation thereof, but also after it has been filed with the appropriate federal, state or city agency. Of course, this is especially true if such client has reason to believe that a tax refund is due.

Needless to say, given the number of taxpayers who use the services of any given tax preparer or firm of preparers, the magnitude of potential status inquiries to be handled by each preparer represents, at the least, an unproductive activity on the part of the preparer; it is most often a burden, an inconvenience, and an annoyance.

It would therefore be advantageous to provide an automated system for responding to inquiries by clients of a service provider.

It would also be advantageous to provide such a system that could be used over telephone lines, by the use of paging systems, via e-mail, or by means of any communication system now known or hereafter invented.

It would further be advantageous to provide an automated voice response (AVR) system based on data residing in an electronic database which is updated by an e-file.

It would also be advantageous to provide an AVR system that could provide information about data, if any, that has changed or that has been updated since the last status inquiry.

It would also be advantageous to provide an AVR system that can actually anticipate the inquiry of the caller, the status being transmitted to the client only a short time after the data has been updated.

It would further be advantageous to provide an AVR system tailored to tax preparers and taxpayers relating to tax returns and/or refunds due.

SUMMARY OF THE INVENTION

The present invention is a method for providing status information to a client based on data residing in an electronic database updated by an e-file. The database of the information is maintained and updated, and is periodically analyzed by the inventive system to determine whether at least a portion of the data has changed since the last analysis or communication. If so, the client is automatically informed by the system, which initiates an automatic voice response (AVR) call out to the client. The client verifies that he or she is the true intended recipient of the status information before it is communicated. A log of this communication is also maintained by the system. The client has the opportunity to respond to the system AVR call and/or correct or provide additional information, the client voice response being stored in an appropriate voice mailbox maintained by the inventive system.

BRIEF DESCRIPTION OF THE DRAWINGS

A complete understanding of the present invention may be obtained by reference to the accompanying drawings, when considered in conjunction with the subsequent detailed description, in which.

DETAILED DESCRIPTION OF THE PREFERRED EMBODIMENT

Generally speaking, the invention is a system for providing status information to a client based on data residing in an electronic database. The database of the information is maintained and updated, and is periodically analyzed by the inventive system to determine whether at least a portion of the data has changed since the last analysis. If so, the client is automatically informed by the system, which initiates an automatic voice response (AVR) call out to the client. For purposes of brevity herein, the term AVR is intended to encompass any similar technology that can perform an AVR function.

Figure 1:
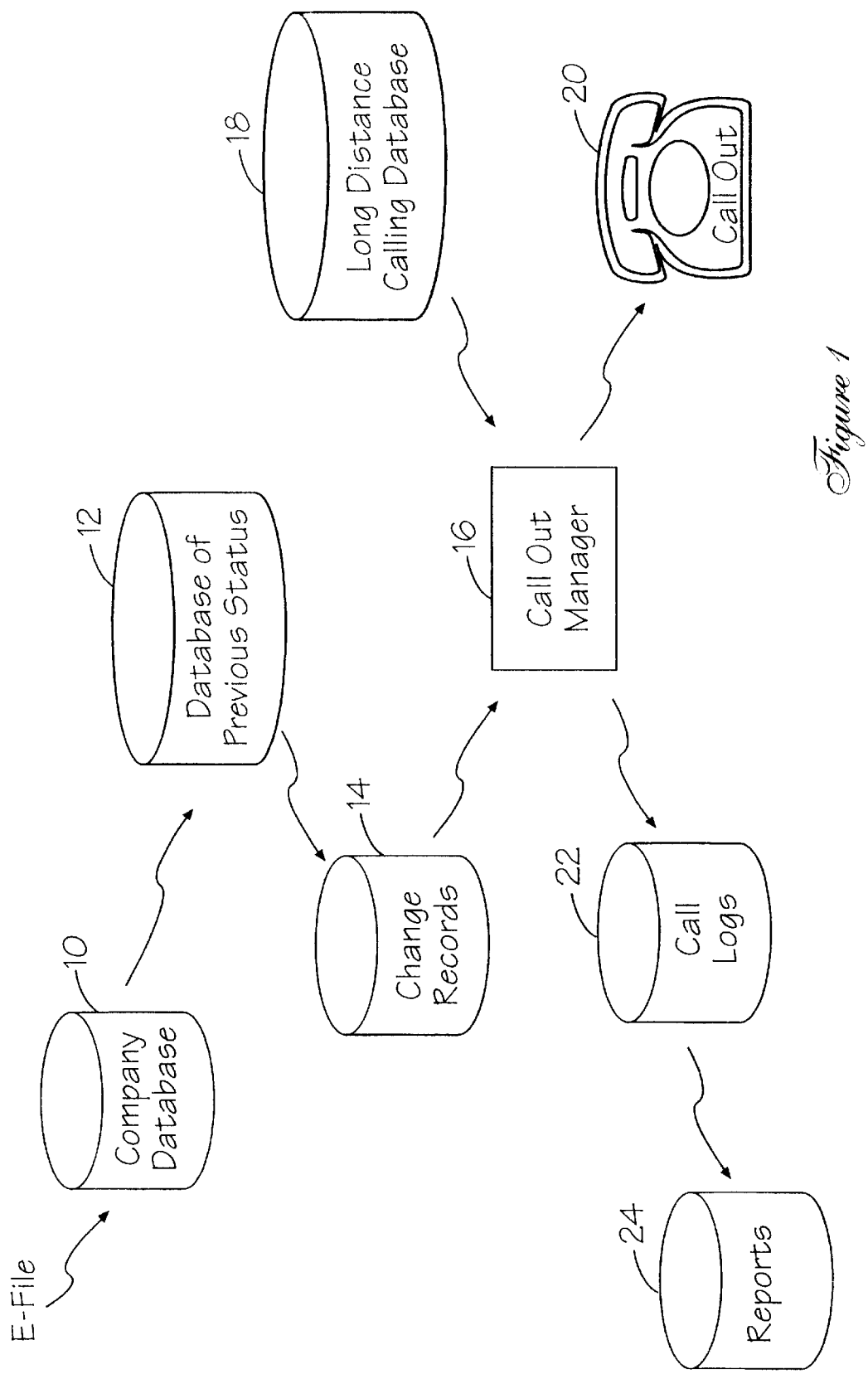
FIG. 1 is a block diagram of the system in accordance with the present invention.

Referring now to FIG. 1, there is shown a block diagram of the system in accordance with the present invention. A company database 10 contains information relevant to tasks being performed by the service provider (e.g., accountant, lawyer, architect). For example, the company database 10 may contain current status of an electronically filed tax return. Such information can be provided to the company database 10 by means of a so-called e-file, but it should be understood that other methods for providing such information to the company database 10 can also be used.

Connected to the company database 10 is a database of previous status 12. This database 12 contains information representative of the last update of data to the company database 10. Change records 14 are generated by the database of previous status 12. In the change records 14 reside a list of clients and the current status to be reported to the inquiring client. Moreover, the change records 14 also contain the call out times defined by the client upon system initialization. These call out times and preferences are generally presented by the client to the service provider during an interview. They are stored in a field in the database. If the client declines this call out option initially, he or she can still enable the feature at a later time (e.g., after successfully receiving a status message during a call-in to the system).

The change records 14 are accessible by a call out manager 16, which controls the release of information upon request by the client or automatically upon a change in status of the company database 10 and the database of previous status 12.

Connected to the call out manager 16 is a long distance calling database 18, which allows the system to call or otherwise transmit data to the client in the most efficient way and/or at the lowest cost. Also connected to the call out manager 16 is a modem or other device 20 whose purpose is to communicate with the call out manager 16 by means of a technology that can perform the communication function and may available in the future.

The call out manager 16 also optionally directs information to a storage device for retaining call logs 22 and to an optional report generator 24 for transaction analysis at a later time.

Figure 2:
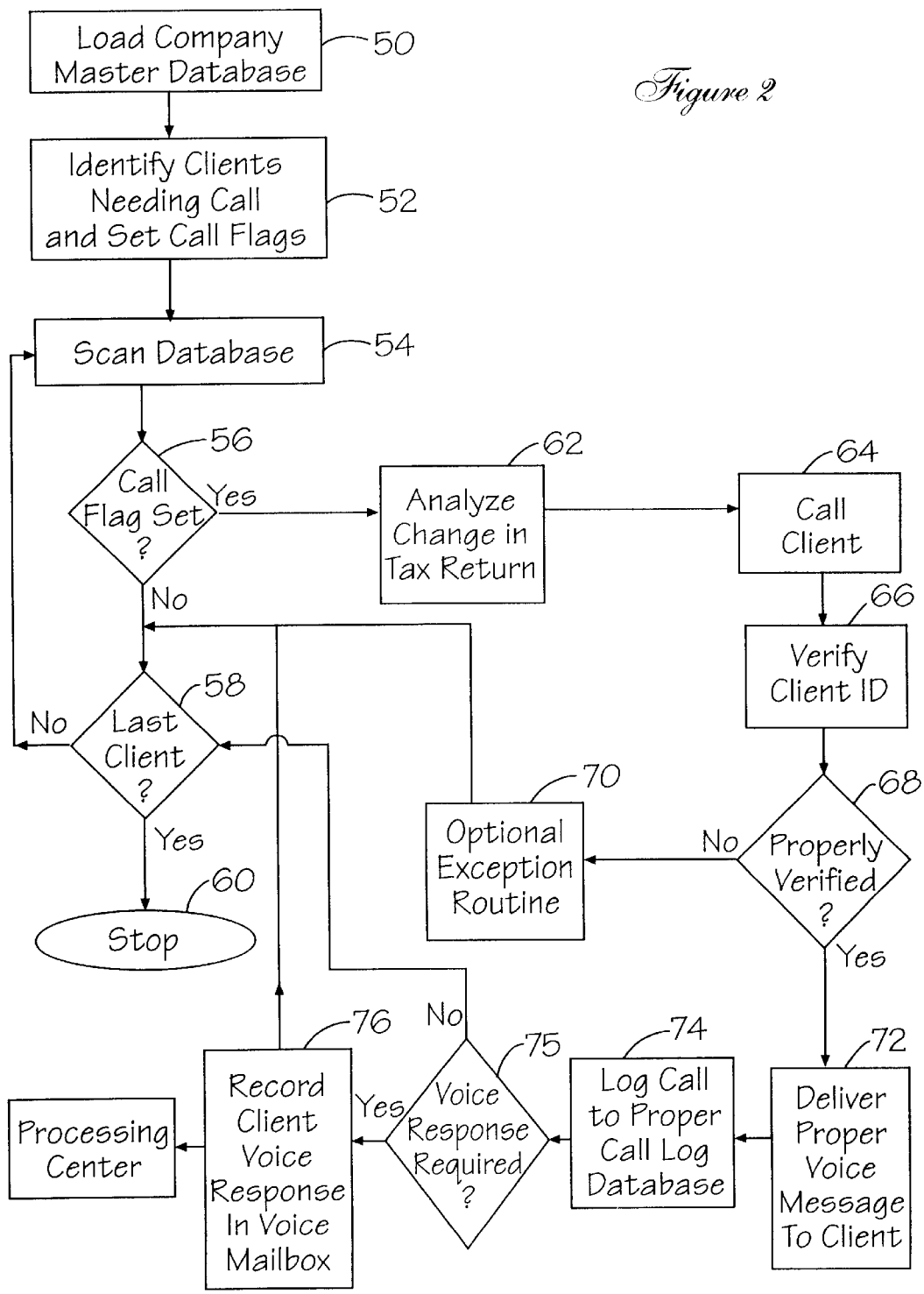
FIG. 2 is a flow chart depicting system operations and procedures in accordance with the present invention.

Referring now also to FIG. 2, there is shown a flow chart of operations in accordance with the present invention. In operation, the company database 10 (FIG. 1) is loaded by means of an e-file or by another mechanism now known or later invented, step 50. The system identifies those clients who may have requested a one-time or a continuing status information communication, step 52. The list of such clients is generated by means of a questionnaire or interview, which establishes the fact that the client desires to be notified, automatically, about the status of the project under consideration. The client may desire to be called by phone during the day only, for example, or at night or weekends only. The system is thus informed of the client preference and takes such preference into account when a status communication is to be made. Of course, this preference can be changed at any time, as long as the client communicates such a change to the system. A flag, not shown, is provided as part of the company database 10 for determining when and/or if the call out manager 16 should communicate with one or more pre-identified clients.

The company database 10 is scanned, step 54, either on an intermittent or, preferably, on an on-going, substantially continuous basis. If the aforementioned call flag has not been set, step 56, the system determines whether the inquirer is the last client, step 58. If so, the system ceases processing, step 60. If the inquirer is not the last one, however, the company database 10 continues to be scanned, step 54.

If the call flag has been set, step 56, the system analyzes any change(s) in the company database 10 corresponding to the process being performed (e.g., the tax return status), step 62, by means of the database of previous status 12 (FIG. 1). If the status of the project has indeed changed, in the automatic notification mode, the client is called, step 64, via the call out manager 16 and call out device 20. In the non-automatic notification mode, however, the system does not initiate a status report to the client, but rather awaits the client to access the system.

In automatic or non-automatic mode, the system calls or responds to the client, respectively, step 64, and then requests verification of the client, step 66, prior to communicating what is likely to be confidential information. Conventional ways to verify that the person answering the telephone or accessing e-mail is in fact the intended recipient of the information are, for example, to request the social security number or a prearranged password or the maiden name of a relative of the person. If the person answering the telephone fails the verification test, step 68, an optional exception routine can be performed, step 70, as shown in FIG. 2. The routine can comprise an announcement or message and a) disabling the call out feature to the previously stored telephone number or e-mail address, or b) announcing or communicating the telephone number or e-mail address of the institution that owns the system. Alternatively, the system may merely hang up or disconnect. System processing can also be terminated until verification is accomplished or other intervention occurs.

Once the inquirer/recipient has been properly identified, step 68, the call out manager 16 initiates a transfer of information to the client, step 72, by means of any suitable communication device 20. At approximately the same time, the call out manager 16 also directs call logs 22 to store a record of message receipts in the call log device 22, step 74, in order to satisfy auditors or government agencies (e.g., the Internal Revenue Service).

If a voice response is required, step 75, the system then invites or permits the client to leave a message (e.g., a voice message, if over the telephone line), step 76, to be stored in a voice mailbox, not shown, or with the call logs 22 for further processing at a later time. The client message can include corrected information (e.g., a corrected address or social security number) or may include additional information. As part of the logging operation, step 74, the call out manager 16 also generates reports 24 which are sufficient documentation that notification of rejects has occurred within the time required by government agencies such as the IRS. Once the voice mailbox receives the client message, step 76, control returns to the processing center.

Since other modifications and changes varied to fit particular operating requirements and environments will be apparent to those skilled in the art, this invention is not considered limited to the example chosen for purposes of this disclosure, and covers all changes and modifications which does not constitute departures from the true spirit and scope of this invention.

Having thus described the invention, what is desired to be protected by Letters Patent is presented in the subsequently appended claims.

What is claimed is:

1. An apparatus for automatically advising a client of a tax preparation service of a change in status of a tax return associated with that client, comprising:

a) a company database comprising a plurality of client records, each of said client records containing predetermined information associated with a client, said company database being selectively by at least one of the agencies: Internal Revenue Service (IRS), a state taxing authority;

b) a database of previous status having a plurality of client records, at least one client record being associated with said clients and including at least a status of a tax return thereof;

c) means for analyzing, operative upon said database of previous status, for determining when information in one of said plurality of client records therein has changed, and for generating a change record when information in said client record has changed;

d) a change records database operatively connected to said means for analyzing for receiving and storing said change record; and e) a call out manager operatively connected to said change records database for automatically communicating with said client, said communication being controlled by information stored in a corresponding record of said company database.

2. The apparatus for automatically advising a client of a tax preparation service of a change in status of a tax return associated with that client, as recited in claim 1, further comprising:

f) means for generating a log of calls made by said call out manager.

3. The apparatus for automatically advising a client of a tax preparation service of a change in status of a tax return associated with that client, as recited in claim 2, further comprising:

g) means for generating a report from said log of calls made by said call out manager, operatively connected thereto.

4. The apparatus for automatically advising a client of a tax preparation service of a change in status of a tax return associated with that client, as recited in claim 1, further comprising:

f) a calling database operatively connected to said call out manager containing information for facilitating communication with said client, said calling database containing at least one of: lowest cost routing and most efficient routing.

5. The apparatus for automatically advising a client of a tax preparation service of a change in status of a tax return associated with the client, as recited in claim 1, wherein said call out manager communicates with said client by means of at least one of the communicates modalities: automatically generated voice message via telephone, automatically generated pager message, automatically generated e-mail, automatically generated message delivered via the internet, other automatically generated message.

6. A apparatus for automatically advising a client of a tax preparation service of a change in status of a tax return associated with that client, as recited in claim 1, wherein said records of said company database further comprise at least one preferable time of day specified by said client and wherein said call out manager communicates with said client at approximately a client-specified time of day.

7. The apparatus for automatically advising a client of a tax preparation service of a change in status of a tax return associated with that client, as recited in claim 5, wherein said call out manager comprises means for receiving and storing a voice response from said client with whom communication has been automatically established.

8. The method for automatically communicating a change of status of a tax return to a client, the steps comprising:

a) providing a company database comprising a plurality of client records and adding a new record for a client thereto, said new record containing at least information representative of a preferred communication modality associated with said client, by at least one of the agencies: Internal Revenue Service (IRS), a state taxing authority;

b) providing a database of previous status comprising a plurality of client records and adding a new client record containing at least a status of a tax return for said client thereto;

c) periodically updating said database of previous status with information provided by a third party;

d) analyzing each record of said previous status database and identifying records thereof in which predetermined information has changed since a prior analysis of said previous status database and creating a change record for each change record of said previous status database, said change records forming a change records database; and e) using a call out manager to traverse the records of said change records database and to automatically originate communication with a respective one of said clients associated with at least one record of said change records database, said communication being in a communication modality defined in a respective client record of said company database.

9. The method for automatically communicating a change of status of a tax return to a client, as recited in claim 8, wherein said updating step (c) is performed using an e-file.

10. The method for automatically communicating a change of status of a tax return to a client, as recited in claim 8, the steps further comprising:

f) storing information about a call placed by said call out manger in a log file.

11. The method for automatically communicating a change of status of a tax return to a client, as recited in claim 8, wherein said communication with a respective one of said client is by at least one of the communication modalities: automatically generated voice message via telephone, automatically generated paper message, automatically generated e-mail, automatically generated message delivered via the Internet, other automatically generated message.

12. The method for automatically communicating a change of status of a tax return to a client, as recited in claim 11, wherein said using a call out manager step (e) comprises the sub-step of using a long distance database to optimize at least one of the group: the cost of said communication and the routing of said communication.

13. The method for automatically communicating a change of status of a tax return to a client, as recited in claim 11, wherein said communication is initiated at a time of day in accordance with a client preference stored in a respective record of said plurality of records of said company database.

* * * * *